United States Patent
Okubo

(10) Patent No.: US 10,699,562 B2
(45) Date of Patent: Jun. 30, 2020

(54) DRIVER ASSISTANCE SYSTEM AND DRIVER ASSISTANCE METHOD

(71) Applicant: TOYOTA JIDOSHA KABUSHIKI KAISHA, Toyota-shi, Aichi-ken (JP)

(72) Inventor: Soichi Okubo, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 197 days.

(21) Appl. No.: 16/007,627

(22) Filed: Jun. 13, 2018

(65) Prior Publication Data

US 2019/0066491 A1 Feb. 28, 2019

(30) Foreign Application Priority Data

Aug. 25, 2017 (JP) ................................ 2017-162394

(51) Int. Cl.
*G08G 1/01* (2006.01)
*H04W 4/46* (2018.01)
*H04W 4/48* (2018.01)

(52) U.S. Cl.
CPC ......... *G08G 1/0125* (2013.01); *G08G 1/0112* (2013.01); *G08G 1/0133* (2013.01); *H04W 4/46* (2018.02); *H04W 4/48* (2018.02)

(58) Field of Classification Search
CPC ........ H04W 4/46; H04W 4/48; G08G 1/0112; G08G 1/0125; G08G 1/0133
See application file for complete search history.

(56) References Cited

U.S. PATENT DOCUMENTS

| 6,111,539 | A | * | 8/2000 | Mannings | ........ G08G 1/096716 |
| | | | | | 342/357.31 |
| 9,550,498 | B2 | * | 1/2017 | Meyer | ................... B60W 30/14 |
| 2012/0254707 | A1 | * | 10/2012 | Cooke | ..................... G01C 21/32 |
| | | | | | 714/799 |
| 2016/0035221 | A1 | * | 2/2016 | McDevitt-Pimbley | ...................... |
| | | | | | H04W 4/90 |
| | | | | | 701/119 |
| 2017/0322035 | A1 | * | 11/2017 | Dorum | .................... G01C 21/30 |

FOREIGN PATENT DOCUMENTS

| JP | 2010127742 A | 6/2010 |
| JP | 2017102041 A | 6/2017 |

* cited by examiner

*Primary Examiner* — Ramsey Refai
(74) *Attorney, Agent, or Firm* — Hunton Andrews Kurth LLP

(57) ABSTRACT

A driver assistance system includes a travel information receiving unit configured to receive travel information on nearby vehicles using inter-vehicle communication; a travel path generation unit configured to generate a travel path of each nearby vehicle; a crossing point calculation unit configured to extract the travel paths generated and crossing each other, and to calculate a crossing point of the extracted travel paths; a grade separation determination unit configured to perform determination as to whether the crossing point is a grade-separated junction, and to determine that the crossing point is the grade-separated junction in a case where a time difference is equal to or smaller than a specified threshold, the time difference being calculated from times at which the nearby vehicles traveling on the extracted travel paths pass the crossing point; and a driver assistance changing unit configured to change driver assistance based on a result of the determination.

4 Claims, 3 Drawing Sheets

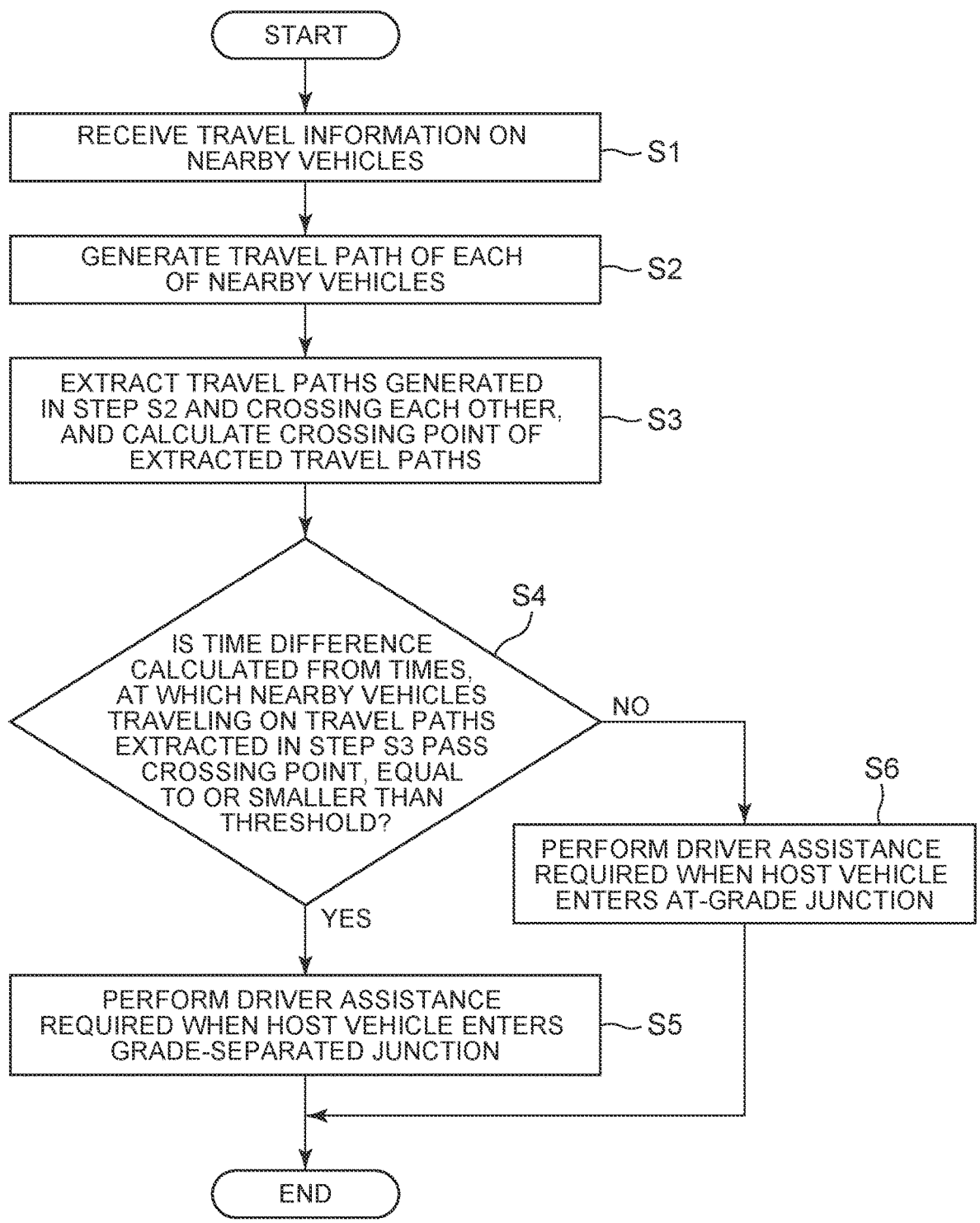

DRIVER ASSISTANCE SYSTEM AND DRIVER ASSISTANCE METHOD

INCORPORATION BY REFERENCE

The disclosure of Japanese Patent Application No. 2017-162394 filed on Aug. 25, 2017 including the specification, drawings and abstract is incorporated herein by reference in its entirety.

BACKGROUND

1. Technical Field

The disclosure relates to a driver assistance system and a driver assistance method.

2. Description of Related Art

A route guide system is disclosed in Japanese Patent Application Publication No. 2010-127742 (JP 2010-127742 A) described below. The route guide system determines that a junction is an at-grade junction when a magnitude relationship between an average speed of a vehicle that passes the junction from an approach road A and an average speed of a vehicle that passes the junction from an approach road B is periodically changed. The route guide system determines that the junction is a grade-separated junction when the magnitude relationship between the average speed of the vehicle that passes the junction from the approach road A and the average speed of the vehicle that passes the junction from the approach road B is not changed.

SUMMARY

In the case where a first road and a second road cross each other at grade and a third road is provided along the first road to be located above the first road, a speed of a vehicle traveling on the first road periodically fluctuates while a speed of a vehicle traveling on the third road is substantially constant. Thus, a sum of the speed of the vehicle traveling on the third road and the speed of the vehicle traveling on the first road periodically fluctuates. For this reason, the route guide system disclosed in JP 2010-127742 A may make an erroneous determination that the first road and the third road cross each other at grade.

The disclosure provides a driver assistance system and a driver assistance method determining whether roads cross each other at different grades with a high degree of accuracy and assisting a driver based on a determination result.

A first aspect of the disclosure relates to a driver assistance system including a travel information receiving unit configured to receive travel information on a plurality of nearby vehicles with use of inter-vehicle communication; a travel path generation unit configured to generate a travel path of each of the nearby vehicles based on the travel information on the nearby vehicle; a crossing point calculation unit configured to extract the travel paths that are generated and cross each other, and to calculate a crossing point of the extracted travel paths; a grade separation determination unit configured to perform determination as to whether the crossing point is a grade-separated junction, and to determine that the crossing point is the grade-separated junction in a case where a time difference is equal to or smaller than a specified threshold, the time difference being calculated from times at which the nearby vehicles traveling on the travel paths extracted by the crossing point calcula- tion unit pass the crossing point; and a driver assistance changing unit configured to change driver assistance based on a result of the determination performed by the grade separation determination unit.

In the above-described aspect, the specified threshold may be shorter than a duration from a time at which a traffic light installed at the crossing point allows traffic to proceed to a time at which the traffic light prohibits the traffic from proceeding.

A second aspect of the disclosure relates to a driver assistance method including receiving travel information on a plurality of nearby vehicles with use of inter-vehicle communication; generating a travel path of each of the nearby vehicles based on the travel information on the nearby vehicle; extracting the travel paths that are generated and cross each other, and calculating a crossing point of the extracted travel paths; performing determination as to whether the crossing point is a grade-separated junction, wherein the crossing point is determined to be the grade-separated junction in a case where a time difference is equal to or smaller than a specified threshold, the time difference being calculated from times at which the nearby vehicles traveling on the extracted travel paths pass the crossing point; and changing driver assistance based on a result of the determination.

The disclosure can provide the driver assistance system and the driver assistance method determining whether roads cross each other at different grades with a high degree of accuracy and assisting a driver based on a determination result.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a flowchart showing an example of processing executed by the driver assistance system according to the embodiment.

DETAILED DESCRIPTION OF EMBODIMENTS

Figure 1:
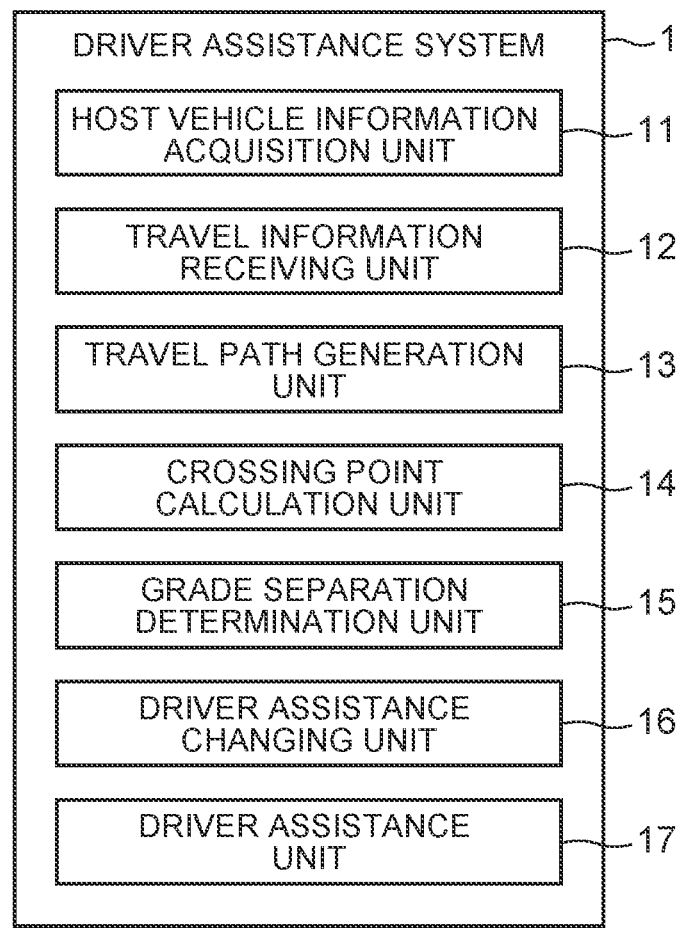
FIG. 1 is a diagram showing an example of a configuration of a driver assistance system according to an embodiment.

An embodiment of the disclosure will be described with reference to the accompanying drawings. In the drawings, members denoted by the same reference numerals and symbols have the same or similar configurations.

Figure 2:
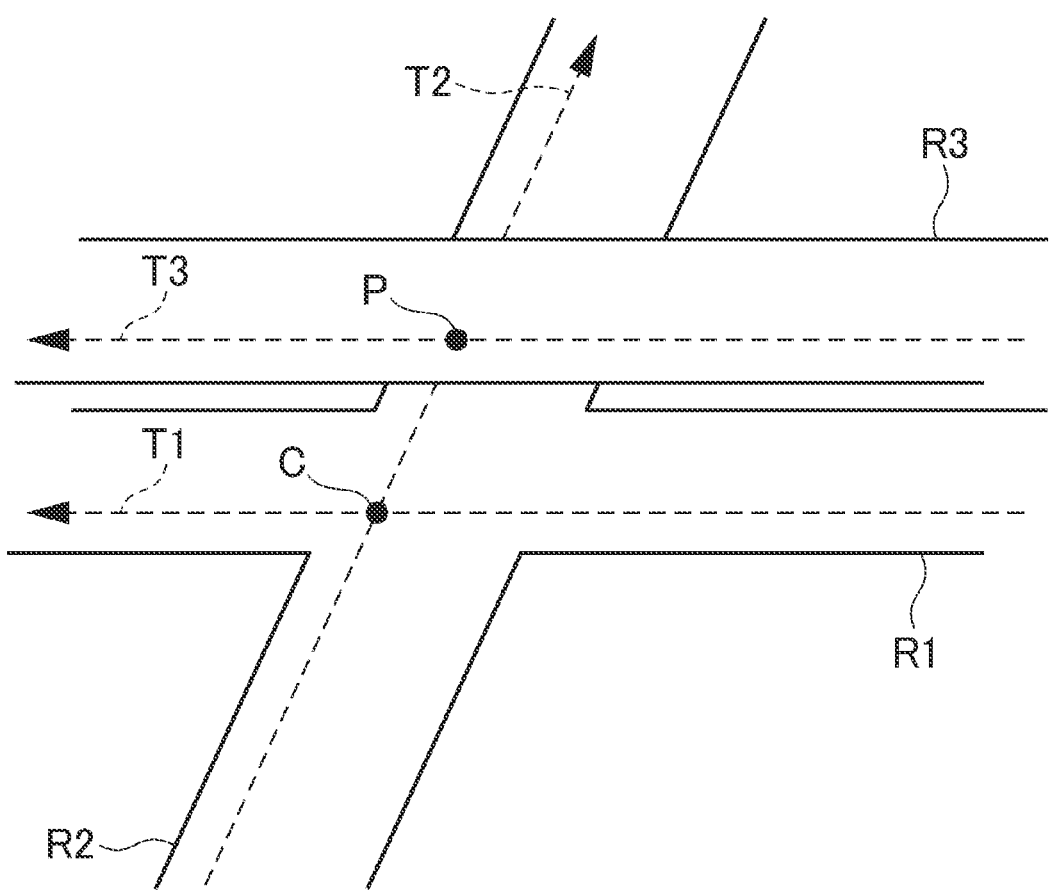
FIG. 2 is a view showing an example of travel paths generated by the driver assistance system according to the embodiment and an example of crossing points calculated by the driver assistance system according to the embodiment.

Referring to FIG. 1 and FIG. 2, a configuration of a driver assistance system according to the embodiment will be described. As shown in FIG. 1, a driver assistance system 1 includes a host vehicle information acquisition unit 11, a travel information receiving unit 12, a travel path generation unit 13, a crossing point calculation unit 14, a grade separation determination unit 15, a driver assistance changing unit 16, and a driver assistance unit 17. The driver assistance system 1 is provided in an inter-vehicle communication device, for example. The driver assistance system 1 is implemented by, for example, an electronic control unit (ECU). The ECU includes a memory that stores data and programs, and a central processing unit (CPU) that executes the programs. That is, the host vehicle information acquisition unit 11, the travel information receiving unit 12, the travel path generation unit 13, the crossing point calculation unit 14, the grade separation determination unit 15, the driver assistance changing unit 16, and the driver assistance unit 17 are implemented by, for example, an ECU.

The driver assistance system 1 includes at least the travel information receiving unit 12, the travel path generation unit 13, the crossing point calculation unit 14, the grade separation determination unit 15, and the driver assistance changing unit 16 among the above-described constituents. The driver assistance system 1 may include any constituent other than the above-described constituents.

The host vehicle information acquisition unit 11 acquires vehicle information on a host vehicle (hereinafter also referred to as "host vehicle information") with the use of, for example, various sensors mounted on the host vehicle, such as a gyroscope sensor, an acceleration sensor, and a geomagnetic sensor, a Global Positioning System (GPS) receiver, and so on. The host vehicle information includes, for example, information on a location, a speed, acceleration, and a direction of the host vehicle.

The travel information receiving unit 12 receives travel information on nearby vehicles with the use of inter-vehicle communication (i.e., vehicle-to-vehicle communication). The inter-vehicle communication is bidirectional wireless communication between the host vehicle and the nearby vehicles located around the host vehicle. The travel information includes, for example, information on a location, a speed, acceleration, and a direction of each of the nearby vehicles. The nearby vehicle signifies a vehicle other than the host vehicle herein.

The travel path generation unit 13 generates a travel path of each of the nearby vehicles on the basis of the travel information on the nearby vehicle. For example, the travel path is generated by connecting the locations of each of the nearby vehicles detected at every 100 milliseconds, on the basis of the travel information.

For example, when the host vehicle travels on a road R1 shown in FIG. 2, the travel path generation unit 13 generates a travel path T1 of the nearby vehicle that travels on the road R1. When the host vehicle travels on a road R3 shown in FIG. 2, the travel path generation unit 13 generates a travel path T3 of the nearby vehicle that travels on the road R3. Along with the generation of the travel path T1 or the travel path T3, the travel path generation unit 13 also generates, for example, a travel path T2 of the nearby vehicle that travels on a road R2. The road R2 and the road R1 cross each other at grade (i.e., at the same height). The road R2 and the road R3 cross each other at different grades (i.e., at different heights).

The crossing point calculation unit 14 extracts the travel paths that are generated and cross each other, and calculates a crossing point of the extracted travel paths. For example, when the host vehicle travels on the road R1 shown in FIG. 2, the crossing point calculation unit 14 extracts the travel path T1 and the travel path T2 and calculates a crossing point C shown in FIG. 2.

The crossing point calculated by the crossing point calculation unit 14 signifies a point of intersection of the two travel paths at the time when the travel paths are seen from above. Thus, when the host vehicle travels on the road R3 shown in FIG. 2, the crossing point calculation unit 14 extracts the travel path T3 and the travel path T2 and calculates the crossing point C shown in FIG. 2. In this case, the crossing point C matches a point P on the travel path T3 when the crossing point C is moved in parallel in a direction perpendicular to a road surface where the road R1 and the road R2 cross each other at grade, for example.

The crossing point calculation unit 14 may extract a plurality of pairs of two travel paths that cross each other, and may calculate the crossing point for each pair of the travel paths.

The grade separation determination unit 15 can determine that the crossing point is a grade-separated junction in the case where a time difference calculated from times, at which the nearby vehicles traveling on the travel paths extracted by the crossing point calculation unit 14 pass the crossing point, is equal to or smaller than a specified threshold (i.e., in the case where a time difference is equal to or smaller than a specified threshold, the time difference being calculated from times at which the nearby vehicles traveling on the travel paths extracted by the crossing point calculation unit 14 pass the crossing point). It is because, when the traffic volume is equal to or larger than a certain volume, the time difference between the times at which the two nearby vehicles pass the crossing point tends to be smaller at a grade-separated junction where the traffic is not controlled by a traffic light than at an at-grade junction. For example, in an urban area and the like with the large traffic volume, while this time difference may be several seconds at the grade-separated junction, this time difference hardly becomes shorter than a duration from a time at which the traffic light allows traffic to proceed to a time at which the traffic light prohibits the traffic from proceeding, at the at-grade junction. Therefore, the specified threshold may be shorter than the duration from the time at which the traffic light installed at the crossing point allows traffic to proceed to the time at which the traffic light prohibits the traffic from proceeding.

For example, in the case where the host vehicle travels on the road R1 shown in FIG. 2, the grade separation determination unit 15 determines that the road R1 and the road R2 cross at grade on the basis of a time difference calculated from a time at which the nearby vehicle traveling on the road R1 passes the crossing point C and a time at which the nearby vehicle traveling on the road R2 passes the crossing point C.

In the case where the host vehicle travels on the road R3 shown in FIG. 2, the grade separation determination unit 15 determines that the road R3 and the road R2 cross each other at the different grades on the basis of a time difference calculated from a time at which the nearby vehicle traveling on the road R3 passes the point P and the time at which the nearby vehicle traveling on the road R2 passes the crossing point C.

The grade separation determination unit 15 may calculate the above-described time difference for each pair of the travel paths in the case where the crossing point calculation unit 14 calculates the crossing point for each pair of the travel paths. Then, the grade separation determination unit 15 may determine that the crossing point is a grade-separated crossing junction in the case where at least one of the time differences is smaller than the specified threshold.

The driver assistance changing unit 16 changes driver assistance (assistance for the driver) based on a result of the determination performed by the grade separation determination unit 15. More specifically, the driver assistance changing unit 16 requests the driver assistance unit 17 to perform driver assistance in different manners depending on whether the crossing point is determined to be a grade-separated junction or an at-grade junction.

In the case where the crossing point is determined to be a grade-separated junction, the driver assistance unit 17 performs the driver assistance that is required when the host vehicle passes the grade-separated junction. In the case where the crossing point is determined to be an at-grade junction, the driver assistance unit 17 performs the driver assistance that is required when the host vehicle passes the at-grade junction. In each of the cases, the driver assistance is provided by outputting a message to the host vehicle's driver with the use of a display or a speaker. Note that the driver assistance unit 17 may not perform the driver assistance in the case where the crossing point is determined to be a grade-separated junction or in the case where the crossing point is determined to be an at-grade junction.

Next, with reference to FIG. 3, an example of processing executed by the driver assistance system according to the embodiment will be described.

The travel information receiving unit 12 receives the travel information on a plurality of nearby vehicles (step S1).

The travel path generation unit 13 generates the travel path of each of the nearby vehicles (step S2).

The crossing point calculation unit 14 extracts the travel paths generated in step S2 and crossing each other, and calculates the crossing point of the extracted travel paths (step S3).

The grade separation determination unit 15 determines whether (i.e., performs determination as to whether) the time difference calculated from the times, at which the nearby vehicles traveling on the travel paths extracted in step S3 pass the crossing point, is equal to or smaller than the specified threshold. Then, the driver assistance changing unit 16 changes the driver assistance based on the result of the determination (step S4).

When the grade separation determination unit 15 determines that the time difference is equal to or smaller than the specified threshold, the grade separation determination unit 15 determines that the crossing point is a grade-separated junction. Then, the driver assistance changing unit 16 advances the processing to step S5 (step S4: YES). In this case, the driver assistance unit 17 performs the driver assistance that is required when the host vehicle enters the grade-separated junction (step S5).

When the grade separation determination unit 15 determines that the time difference exceeds the specified threshold, the grade separation determination unit 15 determines that the crossing point is an at-grade junction. Then, the driver assistance changing unit 16 advances the processing to step S6 (step S4: NO). In this case, the driver assistance unit 17 performs the driver assistance that is required when the host vehicle enters the at-grade junction (step S6).

The embodiment of the disclosure has been described so far. In the driver assistance system 1 according to this embodiment, determination as to whether the crossing point is a grade-separated junction. In the case where the time difference calculated from the times, at which the nearby vehicles traveling on the travel paths extracted by the crossing point calculation unit pass the crossing point, is equal to or smaller than the specified threshold, the crossing point is determined to be a grade-separated junction. The driver assistance is changed based on the result of the determination. The specified threshold may be shorter than the duration from the time at which the traffic light installed at the crossing point allows traffic to proceed to the time at which the traffic light prohibits the traffic from proceeding.

Therefore, for example, even in the case where the road R1 and the road R2 cross each other at grade and the road R3 is provided along the road R1 to be located above the road R1 as shown in FIG. 2, the driver assistance system 1 can determine whether the junction to which the host vehicle is heading is a grade-separated junction with a high degree of accuracy, and thus the driver assistance system 1 can provide the appropriate assistance to the host vehicle's driver based on this determination result.

In the cases where the road R3 shown in FIG. 2 is a controlled-access highway, the road R1 and the road R2 are ordinary roads, and a ramp for the road R3 exists near a location where the road R1 and the road R2 cross at-grade, the speed of the vehicle that travels on the road R3 may periodically fluctuate. Even in this case, the time difference calculated by the grade separation determination unit 15 differs between the grade-separated junction and the at-grade junction. Therefore, even in this case, the driver assistance system 1 can determine whether the junction to which the host vehicle is heading is a grade-separated junction with the high degree of accuracy, and thus the driver assistance system 1 can provide the appropriate assistance to the host vehicle's driver based on this determination result.

The disclosure is not limited to the above-described embodiment and can be implemented in various other modes without departing from the scope of the disclosure. Therefore, the above-described embodiment is merely an example in any respect and should not be construed in a limited manner. For example, an order of the above-described processing steps can be changed or the above-described process steps can be executed in parallel as long as there is no contradiction.

What is claimed is:

1. A driver assistance system comprising:
   a travel information receiving unit configured to receive travel information on a plurality of nearby vehicles with use of inter-vehicle communication;
   a travel path generation unit configured to generate a travel path of each of the nearby vehicles based on the travel information on the nearby vehicle;
   a crossing point calculation unit configured to extract the travel paths that are generated and cross each other, and to calculate a crossing point of the extracted travel paths;
   a grade separation determination unit configured to perform determination as to whether the crossing point is a grade-separated junction, and to determine that the crossing point is the grade-separated junction in a case where a time difference is equal to or smaller than a specified threshold, the time difference being calculated from times at which the nearby vehicles traveling on the travel paths extracted by the crossing point calculation unit pass the crossing point; and
   a driver assistance changing unit configured to change driver assistance based on a result of the determination performed by the grade separation determination unit.

2. The driver assistance system according to claim 1, wherein the specified threshold is shorter than a duration from a time at which a traffic light installed at the crossing point allows traffic to proceed to a time at which the traffic light prohibits the traffic from proceeding.

3. The driver assistance system according to claim 1, wherein the grade separation determination unit is configured to determine that the crossing point is an at-grade junction when the time difference exceeds the specified threshold.

4. A driver assistance method comprising:
- receiving travel information on a plurality of nearby vehicles with use of inter-vehicle communication;
- generating a travel path of each of the nearby vehicles based on the travel information on the nearby vehicle;
- extracting the travel paths that are generated and cross each other, and calculating a crossing point of the extracted travel paths;
- performing determination as to whether the crossing point is a grade-separated junction, wherein the crossing point is determined to be the grade-separated junction in a case where a time difference is equal to or smaller than a specified threshold, the time difference being calculated from times at which the nearby vehicles traveling on the extracted travel paths pass the crossing point; and
- changing driver assistance based on a result of the determination.

\* \* \* \* \*